US012127297B2

(12) United States Patent
Goel

(10) Patent No.: US 12,127,297 B2
(45) Date of Patent: Oct. 22, 2024

(54) METHODS, SYSTEMS, AND COMPUTER READABLE MEDIA FOR USING SERVICE COMMUNICATIONS PROXY (SCP) OR SECURITY EDGE PROTECTION PROXY (SEPP) TO APPLY OR OVERRIDE PREFERRED-LOCALITY ATTRIBUTE DURING NETWORK FUNCTION (NF) DISCOVERY

(71) Applicant: Oracle International Corporation, Redwood Shores, CA (US)

(72) Inventor: Yesh Goel, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/468,076

(22) Filed: Sep. 7, 2021

(65) Prior Publication Data
US 2022/0394453 A1  Dec. 8, 2022

Related U.S. Application Data

(63) Continuation-in-part of application No. 17/337,356, filed on Jun. 2, 2021, now Pat. No. 11,888,946.

(51) Int. Cl.
*H04W 8/00* (2009.01)
*H04L 67/51* (2022.01)
*H04W 12/086* (2021.01)

(52) U.S. Cl.
CPC ............ *H04W 8/005* (2013.01); *H04L 67/51* (2022.05); *H04W 12/086* (2021.01)

(58) Field of Classification Search
CPC ..... H04W 8/005; H04W 12/086; H04W 8/00; H04W 88/182; H04W 4/50; H04L 67/51; H04L 67/568; H04L 67/52; H04L 67/562
See application file for complete search history.

(56) References Cited

U.S. PATENT DOCUMENTS

| | | |
|---|---|---|
| 6,014,558 A | 1/2000 | Thomas |
| 8,069,101 B1 | 11/2011 | von Groll et al. |

(Continued)

FOREIGN PATENT DOCUMENTS

| | | |
|---|---|---|
| CN | 105814931 A | 7/2016 |
| CN | 108632312 A | 10/2018 |

(Continued)

OTHER PUBLICATIONS

"3rd Generation Partnership Project; Technical Specification Group Core Network and Terminals; 5G System; Session Management Services; Stage 3 (Release 17)," 3GPP 29.502, V17.1.0, pp. 1-299 (Jun. 2021).

(Continued)

*Primary Examiner* — Thu V Nguyen
*Assistant Examiner* — Ranjan Pant
(74) *Attorney, Agent, or Firm* — Jenkins, Taylor & Hunt, P.A.

(57) ABSTRACT

A method for applying or overriding a preferred-locality attribute during network function (NF) discovery includes, at a service communications proxy (SCP) or security edge protection proxy (SEPP) including at least one processor, receiving, from an NF, an NF discovery request including a preferred-locality attribute or lacking a preferred-locality attribute. The method further includes selecting, by the SCP or SEPP, a value for the preferred-locality attribute for the NF discovery request. The method further includes inserting, by the SCP or SEPP, the value for the preferred-locality attribute into the NF discovery request. The method further includes transmitting, by the SCP or SEPP, the NF discovery request to a network function repository function (NRF).

10 Claims, 9 Drawing Sheets

(56) References Cited

U.S. PATENT DOCUMENTS

| | | | |
|---|---|---|---|
| 8,069,181 B1 | 11/2011 | Krishan et al. | |
| 9,124,537 B2 | 9/2015 | Kolze | |
| 9,246,762 B1 | 1/2016 | Watkins | |
| 10,313,362 B2 | 6/2019 | Ahuja et al. | |
| 10,609,530 B1 | 3/2020 | Patil et al. | |
| 10,637,753 B1 | 4/2020 | Taft et al. | |
| 10,686,667 B1 | 6/2020 | Subramaniam | |
| 10,772,062 B1* | 9/2020 | Albasheir | H04W 60/00 |
| 11,076,281 B1* | 7/2021 | Yau | H04W 8/12 |
| 11,109,307 B2 | 8/2021 | Bartolome Rodrigo et al. | |
| 11,271,846 B2 | 3/2022 | Krishan | |
| 11,470,544 B2 | 10/2022 | Singh et al. | |
| 11,483,694 B2 | 10/2022 | Krishan | |
| 11,496,954 B2 | 11/2022 | Gupta et al. | |
| 11,528,334 B2 | 12/2022 | Krishan | |
| 11,570,262 B2 | 1/2023 | Sapra et al. | |
| 11,589,298 B2 | 2/2023 | Sapra et al. | |
| 11,622,276 B1* | 4/2023 | Wan | H04W 88/182 455/411 |
| 11,652,895 B1 | 5/2023 | Sapra et al. | |
| 11,871,309 B2 | 1/2024 | Jayaramachar et al. | |
| 11,888,946 B2 | 1/2024 | Goel | |
| 11,888,957 B2 | 1/2024 | Krishan | |
| 11,930,083 B2 | 3/2024 | Goel et al. | |
| 2005/0181776 A1 | 8/2005 | Verma et al. | |
| 2005/0193096 A1 | 9/2005 | Yu et al. | |
| 2006/0010224 A1 | 1/2006 | Sekar et al. | |
| 2007/0050331 A1 | 3/2007 | Bauman et al. | |
| 2008/0101293 A1 | 5/2008 | Woo et al. | |
| 2009/0222584 A1 | 9/2009 | Josefsberg et al. | |
| 2013/0080641 A1 | 3/2013 | Lui et al. | |
| 2013/0086265 A1 | 4/2013 | Lu et al. | |
| 2013/0198269 A1 | 8/2013 | Fleischman et al. | |
| 2013/0272123 A1 | 10/2013 | Lee et al. | |
| 2014/0040975 A1 | 2/2014 | Raleigh et al. | |
| 2015/0326441 A1 | 11/2015 | Smith et al. | |
| 2016/0156513 A1 | 6/2016 | Zhang et al. | |
| 2016/0350683 A1 | 12/2016 | Bester et al. | |
| 2016/0380906 A1 | 12/2016 | Hodique et al. | |
| 2017/0077751 A1 | 3/2017 | Forbes | |
| 2017/0221015 A1 | 8/2017 | June et al. | |
| 2018/0205637 A1 | 7/2018 | Li | |
| 2018/0262625 A1 | 9/2018 | McCarley et al. | |
| 2018/0285794 A1 | 10/2018 | Gray-Donald et al. | |
| 2018/0324247 A1 | 11/2018 | Hood et al. | |
| 2019/0007366 A1 | 1/2019 | Voegele et al. | |
| 2019/0140895 A1 | 5/2019 | Ennis, Jr. et al. | |
| 2019/0158364 A1 | 5/2019 | Zhang et al. | |
| 2019/0166001 A1 | 5/2019 | Ma et al. | |
| 2019/0212802 A1 | 7/2019 | Srinivasan et al. | |
| 2019/0222633 A1 | 7/2019 | Howes et al. | |
| 2019/0230556 A1 | 7/2019 | Lee | |
| 2019/0342229 A1 | 11/2019 | Khinvasara et al. | |
| 2019/0394284 A1 | 12/2019 | Baghel et al. | |
| 2020/0036754 A1* | 1/2020 | Livanos | H04W 48/16 |
| 2020/0059420 A1 | 2/2020 | Abraham | |
| 2020/0106812 A1 | 4/2020 | Verma et al. | |
| 2020/0127916 A1 | 4/2020 | Krishan | |
| 2020/0136911 A1 | 4/2020 | Assali et al. | |
| 2020/0137174 A1 | 4/2020 | Stammers et al. | |
| 2020/0305033 A1 | 9/2020 | Keller et al. | |
| 2020/0314615 A1 | 10/2020 | Patil et al. | |
| 2020/0336554 A1 | 10/2020 | Deshpande et al. | |
| 2020/0367148 A1 | 11/2020 | Baek et al. | |
| 2021/0007023 A1 | 1/2021 | Umapathy et al. | |
| 2021/0044481 A1 | 2/2021 | Xu et al. | |
| 2021/0076248 A1 | 3/2021 | Kallam et al. | |
| 2021/0099856 A1 | 4/2021 | Cakulev et al. | |
| 2021/0136602 A1 | 5/2021 | Pokkunuri et al. | |
| 2021/0168055 A1 | 6/2021 | Lair | |
| 2021/0204200 A1 | 7/2021 | Krishan et al. | |
| 2021/0235254 A1 | 7/2021 | Farooq | |
| 2021/0273977 A1 | 9/2021 | Karasaridis et al. | |
| 2021/0274392 A1 | 9/2021 | Dao et al. | |
| 2021/0297935 A1 | 9/2021 | Belling et al. | |
| 2021/0367916 A1 | 11/2021 | Belling et al. | |
| 2021/0368427 A1* | 11/2021 | Rommer | H04W 48/16 |
| 2021/0385286 A1 | 12/2021 | Wang et al. | |
| 2021/0385732 A1 | 12/2021 | Reyes et al. | |
| 2022/0038545 A1 | 2/2022 | Krishan | |
| 2022/0039101 A1 | 2/2022 | Wang et al. | |
| 2022/0070648 A1 | 3/2022 | Krishan | |
| 2022/0103644 A1 | 3/2022 | Park et al. | |
| 2022/0110082 A1 | 4/2022 | Belling et al. | |
| 2022/0131945 A1 | 4/2022 | Sapra et al. | |
| 2022/0159464 A1 | 5/2022 | Rajput et al. | |
| 2022/0191294 A1 | 6/2022 | Yang et al. | |
| 2022/0264432 A1 | 8/2022 | Reyes et al. | |
| 2022/0286949 A1 | 9/2022 | Sapra et al. | |
| 2022/0295384 A1 | 9/2022 | Gupta et al. | |
| 2022/0330085 A1* | 10/2022 | Li | H04L 67/565 |
| 2022/0346188 A1 | 10/2022 | Malhotra | |
| 2022/0394597 A1 | 12/2022 | Goel | |
| 2023/0052267 A1 | 2/2023 | Goel et al. | |
| 2023/0096969 A1 | 3/2023 | Sapra et al. | |
| 2023/0099468 A1* | 3/2023 | Khare | H04W 8/18 455/432.1 |
| 2023/0099676 A1 | 3/2023 | Jayaramachar et al. | |
| 2023/0179681 A1 | 6/2023 | Krishan | |

FOREIGN PATENT DOCUMENTS

| | | | |
|---|---|---|---|
| CN | 114039874 A | 2/2022 | |
| CN | 112584371 B * | 5/2022 | H04L 67/16 |
| CN | ZL202180068287.X | 6/2024 | |
| EP | 3 716 692 A1 | 9/2020 | |
| EP | 4189943 | 7/2024 | |
| KR | 20190057818 A | 5/2019 | |
| KR | 20190088060 A | 7/2019 | |
| KR | 20220006908 A | 1/2022 | |
| WO | WO 2019/144321 A1 | 1/2019 | |
| WO | WO 2019/076276 A1 | 4/2019 | |
| WO | WO 2019/215308 A1 | 11/2019 | |
| WO | WO 2020/001842 A1 | 1/2020 | |
| WO | WO 2020/030291 A1 | 2/2020 | |
| WO | WO-2020083516 A1 * | 4/2020 | H04L 67/16 |
| WO | WO-2020192254 A1 * | 10/2020 | H04L 41/5058 |
| WO | WO 2021/011933 A1 | 1/2021 | |
| WO | WO 2021/092441 A1 | 5/2021 | |
| WO | WO 2021/110287 A1 | 6/2021 | |
| WO | WO 2021219385 A1 | 11/2021 | |
| WO | WO 2022/025987 A1 | 2/2022 | |
| WO | WO 2022/050987 A1 | 3/2022 | |
| WO | WO 2022/093319 A1 | 5/2022 | |
| WO | WO 2022152870 A1 | 7/2022 | |
| WO | WO 2022/179713 A1 | 9/2022 | |
| WO | WO 2022/197531 A1 | 9/2022 | |
| WO | WO 2022/256306 A1 | 12/2022 | |
| WO | WO-2023031836 A1 * | 3/2023 | |

OTHER PUBLICATIONS

"3rd Generation Partnership Project; Technical Specification Group Core Network and Terminals; 5G System; Principles and Guidelines for Services Definition; Stage 3 (Release 17)," 3GPP TS 29.501, V17.2.0, pp. 1-78 (Jun. 2021).

"3rd Generation Partnership Project; Technical Specification Group Services and System Aspects; System architecture for the 5G System (5GS); Stage 2 (Release 17)," 3GPP TS 23,501, V17.0.0, pp. 1-489 (Mar. 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Core Network and Terminals; Numbering, addressing and identification; (Release 17)," 3GPP TS 23.003, V17.1.0, pp. 1-143 (Mar. 2021).

Vixie et al., "Dynamic Updates in the Domain Name System (DNS Update)," Network Working Group, RFC 2136, pp. 1-26 (Apr. 1997).

(56) References Cited

OTHER PUBLICATIONS

Notice of Allowance and Fee(s) Due for U.S. Appl. No. 17/082,871 (Sep. 28, 2022).
Notification of Transmittal of the International Search Report and the Written Opinion of the International Searching Authority, or the Declaration for International Application No. PCT/US2022/031566 (Sep. 2, 2022).
Examiner-Initiated Interview Summary for U.S. Appl. No. 17/672,639 (Aug. 10, 2022).
Notice of Allowance and Fee(s) Due for U.S. Appl. No. 16/945,794 (Aug. 2, 2022).
Non-Final Office Action for U.S. Appl. No. 17/672,639 (Aug. 25, 2022).
Notice of Allowance for U.S. Appl. No. 17/200,777 (Jun. 30, 2022).
Final Office Action for U.S. Appl. No. 17/082,871 (Jun. 6, 2022).
Notice of Allowance for U.S. Appl. No. 17/009,725 (Jun. 13, 2022).
Commonly-Assigned, co-pending U.S. Appl. No. 17/672,639 for "Methods, Systems, and Computer Readable Media for Dynamic Optimized Network Function Discovery for Consumer Network Functions" (Unpublished, filed Feb. 5, 2022).
"3rd Generation Partnership Project; Technical Specification Group Core Network and Terminals; 5G System; Network Function Repository Services, Stage 3 (Release 16)," 3GPP TS 29.510, V16.6.0, pp. 1-227 (Jan. 2021).
Notification of Transmittal of the International Search Report and the Written Opinion of the International Searching Authority, or the Declaration for International Application No. PCT/US2022/019848 (Jun. 14, 2022).
Advisory Action and Examiner-Initiated Interview Summary for U.S. Appl. No. 16/945,794 (May 20, 2022).
Final Office Action for U.S. Appl. No. 16/945,794 (Feb. 8, 2022).
Non-Final Office Action for U.S. Appl. No. 17/082,871 (Feb. 7, 2022).
Commonly-Assigned, co-pending U.S. Appl. No. 17/397,968 for "Methods, Systems, and Computer Readable Media for Processing Network Function (NF) Discovery Requests at NF Repository Function (NRF) Using Prioritized Lists of Preferred Locations" (Unpublished, filed Aug. 9, 2021).
Commonly-Assigned, co-pending U.S. Appl. No. 17/356,461 for "Methods, Systems and Computer Readable Media for Optimizing Network Traffic Distribution using Timeslot-Based Tracked Producer Network Function (NF) Performance During Producer NF Selection" (Unpublished, filed Jun. 23, 2021).
Commonly-Assigned, Co-pending U.S. Appl. No. 17/337,356 for "Methods, Systems, and Computer Readable Media for Applying or Overriding Preferred Locality Criteria in Processing Network Function (NF) Discovery Requests," (Unpublished, filed Jun. 6, 2021).
"3rd Generation Partnership Project; Technical Specification Group Services and System Aspects; Procedures for the 5G System (5GS); Stage 2 (Release 17)," 3GPP TS 23.502, V17.0.0, pp. 1-646 (Mar. 2021).
Non-Final Office Action for U.S. Appl. No. 17/543,989 (Mar. 28, 2023).
Notice of Allowance for U.S. Appl. No. 17/672,639 dated Mar. 20, 2023.
Examiner-Initiated Interview Summary for U.S. Appl. No. 17/397,968 (Mar. 21, 2023).
Examiner-Initiated Interview Summary for U.S. Appl. No. 17/672,639 (Mar. 7, 2023).
Examination_Report for Patent Application No. IN202147036462 (Dec. 29, 2022) 1322/623 PCT/IN.
Non-Final Office Action for U.S. Appl. No. 17/337,356 (Jan. 17, 2023).
Notice of Publication for U.S. Appl. No. 17/356,461 (Dec. 29, 2022).
Ex Parte Quayle Action for U.S. Appl. No. 17/672,639 (Dec. 23, 2022).
Notice of Publication for International Application Serial No. PCT/US2022/031566 (Dec. 8, 2022).
Non-Final Office Action for U.S. Appl. No. 17/397,968 (Dec. 9, 2022).
"3rd Generation Partnership Project; Technical Specification Group Core Network and Terminals; 5G System; Network Function Repository Services; Stage 3 (Release 17)," 3GPP TS 29.510, V17.4.0, pp. 1-284 (Dec. 2021).
Commonly-Assigned, co-pending U.S. Appl. No. 17/485,284 for Methods, Systems and Computer Readable Media For Providing Priority Resolver for Resolving Priorities and Network Function (NF) Instances (Unpublished, filed Sep. 24, 2021).
Notice of Allowance and Fee(s) Due for U.S. Appl. No. 16/356,446 (Sep. 30, 2021).
Notification of Transmittal of the International Search Report and the Written Opinion of the International Searching Authority, or the Declaration for International Application No. PCT/US2021/033031 (May 18, 2021).
Non-Final Office Action for U.S. Appl. No. 16/945,794 (Sep. 15, 2021).
Commonly-Assigned, co-pending U.S. Appl. No. 17/487,142 for "Methods, Systems, and Computer Readable Media for Network Function Discovery Using Preferred-Locality Information" (Unpublished, filed Sep. 28, 2021).
Notification of Transmittal of the International Search Report and the Written Opinion of the International Searching Authority, or the Declaration for International Application No. PCT/US2021/024000 (Jun. 24, 2021).
Non-Final Office Action for U.S. Appl. No. 16/356,446 (Jun. 16, 2021).
Commonly-Assigned, co-pending U.S. Appl. No. 17/337,356 for "Methods, Systems, and Computer Readable Media for Applying or Overriding Preferred Locality Criteria in Processing Network Function (NF) Discovery Requests," (Unpublished, filed Jun. 2, 2021).
Notification of Transmittal of the International Search Report and the Written Opinion of the International Searching Authority, or the Declaration for U.S. Patent Application Serial No. PCT/US2021/020120 (Jun. 1, 2021).
"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).
"3rd Generation Partnership Project; Technical Specification Group Services and System Aspects; Security architecture and procedures for 5G system (Release 17)," 3GPP TS 33.501, V17.1.0, pp. 1-256 (Mar. 2021).
"3rd Generation Partnership Project; Technical Specification Group Core Network and Terminals; 5G System; Public Land Mobile Network (PLMN) Interconnection; Stage 3 (Release 17)," 3GPP TS 29.573, V17.0.0, pp. 1-100 (Mar. 2021).
Commonly-Assigned, co-pending U.S. Appl. No. 17/203,693 for "Methods, Systems, and Computer Readable Media for Hypertext Transfer Protocol (HTTP) Stream Tuning for Load and Overload Control," (Unpublished, filed Mar. 16, 2021).
Commonly-Assigned, co-pending U.S. Appl. No. 17/200,777 for "Methods, Systems, and Computer Readable Media for Supporting Multiple Preferred Localities for Network Function (NF) Discovery and Selection Procedures" (Unpublished, filed Mar. 13, 2021).
Advisory Action for U.S. Appl. No. 16/356,446 (Dec. 22, 2020).
Commonly-Assigned, co-pending U.S. Appl. No. 17/082,871 for "Methods, Systems, and Computer Readable Media for Rank Processing for Network Function Selection," (Unpublished, filed Oct. 28, 2020).
Final Office Action for U.S. Appl. No. 16/356,446 (Sep. 8, 2020).
Commonly-Assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).
Commonly-Assigned, co-pending U.S. Appl. No. 16/945,794 for "Methods, Systems, And Computer Readable Media For Preferred Network Function (NF) Location Routing Using Service Communications Proxy (SCP)," (Unpublished, filed Jul. 31, 2020).

(56) References Cited

OTHER PUBLICATIONS

"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).

"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).

"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).

Non-Final Office Action for U.S. Appl. No. 16/356,446 (May 11, 2020).

Nokia et al., "Discussion paper on authorization for Model D Indirect communications", 3GPP TSG SA WG3; S3-194380 (Nov. 11, 2019).

Commonly-Assigned, co-pending U.S. Appl. No. 16/356,446 for "Methods, Systems, and Computer Readable Media For Locality-Based Selection and Routing of Traffic to Producer Network Functions (NFs)," (Unpublished, filed Mar. 18, 2019).

Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).

Notice of Publication for European Patent Application No. 21713526.8 (May 10, 2023).

Examiner-Initiated Interview Summary for U.S. Appl. No. 17/672,639 (Apr. 21, 2023).

Applicant-Initiated Interview Summary for U.S. Appl. No. 17/543,989 (Jul. 24, 2023).

Applicant-Initiated Interview Summary for U.S. Appl. No. 17/397,968 (Jul. 24, 2023).

Non-Final Office Action for U.S. Appl. No. 17/487,142 (May 8, 2023).

Examiner-Initiated Interview Summary for U.S. Appl. No. 17/337,356 dated May 2, 2023.

Final Office Action for U.S. Appl. No. 17/397,968 (Apr. 27, 2023).

Advisory Action for U.S. Appl. No. 17/397,968 (Jul. 14, 2023).

Final Office Action for U.S. Appl. No. 17/337,356 (Jun. 26, 2023).

Notice of Publication for European Patent Application Serial No. 21718460.5 (Jun. 14, 2023).

First Examination Report for Indian Patent Application Serial No. 202247065596 (May 30, 2023).

Notice of Allowance and Fee(s) Due for U.S. Appl. No. 17/337,356 (Sep. 14, 2023).

Notice of Allowance and Fee(s) Due for U.S. Appl. No. 17/543,989 (Sep. 13, 2023).

Notice of Allowance and Fee(s) Due for U.S. Appl. No. 17/487,142 (Sep. 1, 2023).

Non-Final Office Action for U.S. Appl. No. 17/397,968 (Aug. 23, 2023).

Notice of Publication for European Patent Application Serial No. 21731870.8 (Aug. 9, 2023).

Notice of Allowance for U.S. Appl. No. 17/397,968 dated Dec. 28, 2023.

Applicant-Initiated Interview Summary for U.S. Appl. No. 17/397,968 dated Dec. 14, 2023.

Office Action for Chinese Patent Application Serial No. 202180068287.X (Sep. 28, 2023).

Notice of Allowance for Chinese Patent Application Serial No. 202180068287.X (Apr. 15, 2024).

"3rd Generation Partnership Project, Technical Specification 5G System, Network Function Repository Services; Stage 3 (Release 15)" 3GPP TS 29.510, V15.0.0, pp. 1-66 (Sep. 2018).

Non-Final Office Action for U.S. Appl. No. 17/485,284 (Feb. 28, 2024).

Intent to Grant for European Patent Application Serial No. 21713526.8 (Feb. 21, 2024).

Intent to Grant for European Patent Application Serial No. 21718460.5 (Mar. 14, 2024).

First Examination Report for Indian Patent Application Serial No. 202347016655 (Mar. 12, 2024).

Applicant-Initiated Interview Summary for U.S. Appl. No. 17/485,284 (Jun. 7, 2024).

Office Action for Indian Patent Application Serial No. 202347027680 (May 14, 2024).

Decision to Grant for European Patent Application Serial No. 21718460.5 (Jul. 18, 2024).

Decision to Grant for European Patent Application Serial No. 21713526.8 (Jun. 27, 2024).

\* cited by examiner ated herein by reference in its
METHODS, SYSTEMS, AND COMPUTER READABLE MEDIA FOR USING SERVICE COMMUNICATIONS PROXY (SCP) OR SECURITY EDGE PROTECTION PROXY (SEPP) TO APPLY OR OVERRIDE PREFERRED-LOCALITY ATTRIBUTE DURING NETWORK FUNCTION (NF) DISCOVERY

RELATED APPLICATIONS

This application is a continuation-in-part of U.S. patent application Ser. No. 17/337,356 filed Jun. 2, 2021, the disclosure of which is incorporentirety.

TECHNICAL FIELD

The subject matter described herein relates to processing NF discovery requests. More particularly, the subject matter described herein relates to methods, systems, and computer readable media for using an SCP or an SEPP to apply or override a preferred-locality attribute during NF discovery.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the service communication proxy, and the service communication proxy load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem that may occur in 5G communications networks is that during NF discovery, a consumer NF may specify a preferred-locality attribute in the NF discovery request that has no meaning to the NRF in the network of the NRF, or the consumer NF may not specify a preferred-locality attribute in the NF discovery request. In either case, the NRF that receives the NF discovery request may utilize query parameters in the NF discovery request to generate a prioritized list of NF profiles of producer NFs that match the query parameters. In generating the prioritized list, the NRF uses the registered priority of each producer NF and the preferred-locality information, if present, to set the priorities of producer NF profiles returned to the consumer NF in the discovery response. For example, the NRF may prioritize producer NFs with localities that match the preferred-locality attribute in the discovery request over producer NFs with localities that do not match the preferred-locality attribute in the discovery request. If the preferred-locality attribute is not present in the NF discovery request or if the preferred-locality attribute has no meaning to the NRF because it specifies a locality in another network, the priorities in the list will be set based on the registered priorities of the producer NFs alone, which may result in producer NFs that are farther away from the consumer NF being assigned lower priorities (more preferred) than producer NFs that are closer to the consumer NF. As a result, when selecting a producer NF from the list to provide a service, the consumer NF may select a producer that is farther away from the consumer NF than another producer NF, resulting in increased latency in service communications.

In indirect communications without delegated discovery, NF discovery requests are routed to the NRF. In indirect communications with delegated discovery, the SCP receives an SBI request message from a consumer NF and formulates and sends an NF discovery request to the NRF on behalf of the consumer NF. Like the direct communications cases mentioned in the preceding paragraph and indirect communications without delegated discovery, the NF discovery request may lack a preferred-locality attribute or may include a preferred-locality attribute that has no meaning in the network in which the NRF resides. Similarly, an SEPP may receive and forward inter-PLMN NF discovery requests that lack preferred-locality attributes or include preferred-locality attributes that have no meaning in the network of the NRF that processes the NF discovery request.

In light of these and other difficulties there exists a need for improved NF discovery procedures that increase the likelihood of resulting in an optimized set of NF profiles in an NF discovery response.

SUMMARY

A method for applying or overriding a preferred-locality attribute during network function (NF) discovery includes, at a service communication proxy (SCP) or security edge protection proxy (SEPP) including at least one processor, receiving, from an NF, an NF discovery request including a preferred-locality attribute or lacking a preferred-locality attribute. The method further includes selecting, by the SCP or SEPP, a value for the preferred-locality attribute for the NF discovery request. The method further includes inserting, by the SCP or SEPP, the value for the preferred-locality attribute into the NF discovery request. The method further includes transmitting, by the SCP or SEPP, the NF discovery request to a network function repository function (NRF).

According to another aspect of the subject matter described herein, receiving the NF discovery request with a preferred-locality attribute value set by the NF and wherein inserting the value for the preferred-locality attribute into the NF discovery request includes replacing a value of the preferred-locality attribute set by the NF.

According to another aspect of the subject matter described herein, selecting a value for the preferred-locality attribute includes selecting a value for the preferred-locality attribute that corresponds to a locality of the SCP or SEPP or a locality nearest to the locality of the SCP or SEPP.

According to another aspect of the subject matter described herein, selecting a value for the preferred-locality attribute includes selecting a value for the preferred-locality attribute that is configured by a network operator.

According to another aspect of the subject matter described herein, selecting a value for the preferred-locality attribute includes selecting a value for the preferred-locality attribute that corresponds to a nearest locality to a locality of the SCP or SEPP with at least one heart-beating producer NF capable of providing the service indicated by the query parameters in the NF discovery request.

According to another aspect of the subject matter described herein, receiving the NF discovery request includes receiving the NF discovery request without a preferred-locality attribute and wherein inserting the value for the preferred-locality attribute into the NF discovery request includes adding a value of the preferred-locality attribute to the NF discovery request.

According to another aspect of the subject matter described herein, the SCP or SEPP comprises an SEPP and the NF discovery request comprises an inter-PLMN NF discovery request.

According to another aspect of the subject matter described herein, the SCP or SEPP comprises an SCP and the NF discovery request comprises an inter-PLMN NF discovery request.

According to another aspect of the subject matter described herein, the SCP or SEPP comprises an SCP and the NF discovery request comprises an intra-PLMN NF discovery request.

According to another aspect of the subject matter described herein, the NRF uses the value of the preferred-locality attribute selected by the SCP or SEPP to prioritize producer NF profiles in an NF discovery response.

According to another aspect of the subject matter described herein, a system for applying or overriding a preferred-locality attribute during network function (NF) discovery is provided. The system includes a service communication proxy (SCP) or security edge protection proxy (SEPP) including at least one processor. The system further includes a preferred-locality apply/override module implemented by the at least one processor for receiving, from an NF, an NF discovery request including a preferred-locality attribute or lacking a preferred-locality attribute, selecting a value for the preferred-locality attribute for the NF discovery request, inserting the value for the preferred-locality attribute into the NF discovery request, and transmitting the NF discovery request to a network function repository function (NRF).

According to another aspect of the subject matter described herein, the NF discovery request received by the preferred-locality apply/override module includes a preferred-locality attribute value set by the NF and wherein the preferred-locality apply/override module is configured to replace a value of the preferred-locality attribute set by the NF.

According to another aspect of the subject matter described herein, the preferred-locality apply/override module is configured to select a value for the preferred-locality attribute that corresponds to a locality of the SCP or SEPP or a locality nearest to the locality of the SCP or SEPP.

According to another aspect of the subject matter described herein, the preferred-locality apply/override module is configured to select a value for the preferred-locality attribute that is configured by a network operator.

According to another aspect of the subject matter described herein, the preferred-locality apply/override module is configured to select a value for the preferred-locality attribute that corresponds to a nearest locality to a locality of the SCP or SEPP with at least one heart-beating producer NF capable of providing the service indicated by the query parameters in the NF discovery request.

According to another aspect of the subject matter described herein, the NF discovery request received by the preferred-locality apply/override module lacks a preferred-locality attribute and wherein the preferred-locality apply/override module is configured to add a value of the preferred-locality attribute to the NF discovery request.

According to another aspect of the subject matter described herein, the SEPP or SCP comprises an SEPP and the NF discovery request received by the preferred-locality apply/override module comprises an inter-PLMN NF discovery request.

According to another aspect of the subject matter described herein, the SEPP or SCP comprises an SCP and the NF discovery request received by the preferred-locality apply/override module comprises an inter-PLMN NF discovery request.

According to another aspect of the subject matter described herein, the SEPP or SCP comprises an SCP and the NF discovery request received by the preferred-locality apply/override module comprises an intra-PLMN NF discovery request.

According to another aspect of the subject matter described herein, a non-transitory computer readable medium having stored thereon executable instructions that when executed by a processor of a computer control the computer to perform steps is provided. The steps are performed at a service communication proxy (SCP) or security edge protection proxy (SEPP). The steps include receiving, from a network function (NF), an NF discovery request including a preferred-locality attribute or lacking a preferred-locality attribute. The steps further include selecting, by the SCP or SEPP, a value for the preferred-locality attribute for the NF discovery request. The steps further include inserting, by the SCP or SEPP, the value for the preferred-locality attribute into the NF discovery request. The steps further include transmitting, by the SCP or SEPP, the NF discovery request to a network function repository function (NRF).

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
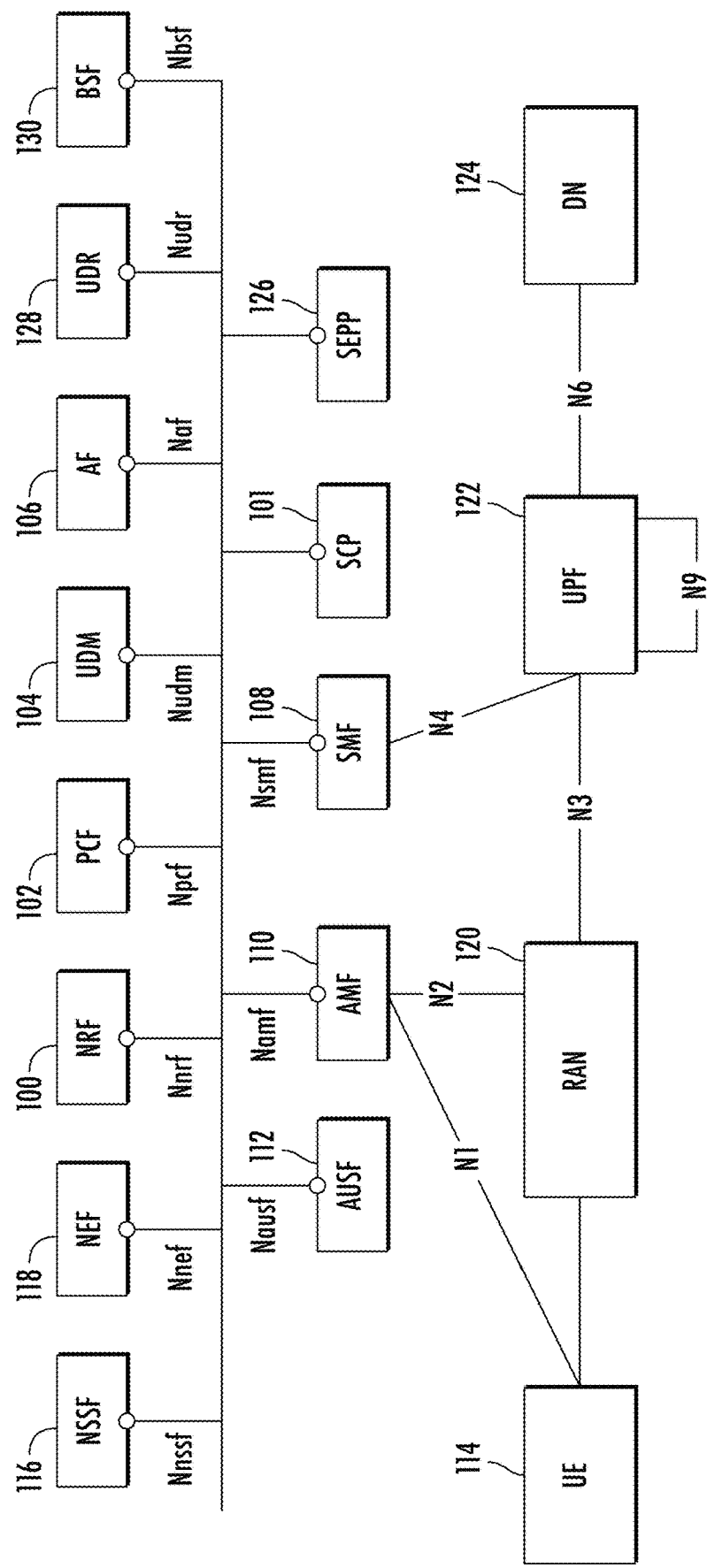
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem in 5G networks is that during NF discovery, a consumer NF either doesn't specify a preferred-locality attribute or specifies a preferred-locality attribute that has no meaning in the network of the receiving NRF. As a result, sub-optimal producer NF selection can occur. During registration with the NRF, each producer NF can specify its locality as a registration attribute or parameter, which is stored by the NRF in a data structure referred to as an NF profile or NF profile object. The registration process is conducted according to 3GPP TS 29.510 where each NF sends an NF register message to NRF 100. The NF register message includes the NF profile of each NF. Table 6.1.6.2.2-1 of 3GPP TS 29.510 defines the attributes that may be included in an NF profile. Of interest to the subject matter described herein is the locality attribute of the NF profile. Table 1 shown below is an excerpt from Table 6.1.6.2.2-1 of 3GPP TS 29.510 illustrating the locality attribute.

TABLE 1

Locality Attribute of NF Profile

| Attribute name | Data type | P | Cardinality | Description |
| --- | --- | --- | --- | --- |
| Locality | string | O | 0 . . . 1 | Operator defined information about the location of the NF instance (e.g. geographic location, data center) (NOTE 3) |

(NOTE 3):
A requester NF may use this information to select a NF instance (e.g. a NF instance preferably located in the same data center).

As illustrated by Table 1, the locality attribute stores operator-defined information about the location of an NF instance, such as geographic location and data center. According to Note 3 of Table 1, the locality attribute can be used during NF discovery to select a producer NF that is in the same data center as the requesting consumer NF. However, the consumer NF may not know the correct locality attribute to specify in a discovery request message, which can result in sub-optimal NF selection.

The preferred-locality is an optional attribute that may be included in an NF discovery request message. Table 2 shown below is an excerpt from Table 6.2.3.2.3.1-1 of 3GPP TS 29.510 and indicates how the NRF processes the preferred-locality attribute in an NF discovery request.

TABLE 2

NRF Processing of Preferred-Locality Attribute

| Attribute Name | Data Type | P | Cardinality | Description | Applicability |
| --- | --- | --- | --- | --- | --- |
| Preferred-locality | String | O | 0 . . . 1 | Preferred target NF location (e.g. geographic location, data center). When present, the NRF shall prefer NF profiles with a locality attribute that matches the preferred-locality. The NRF may return additional NFs in the response not matching the preferred target NF location, e.g. if no NF profile is found matching the preferred target NF location. The NRF should set a lower priority for any additional NFs on the response not matching the preferred target NF location than those matching the preferred target NF location. (NOTE 6) | |

From Table 2, when the preferred-locality attribute is present, the NRF should prefer NF profiles with a locality attribute that matches the preferred-locality attribute in an NF discovery request. The NRF may also return additional NF profiles in the discovery response not matching the preferred-locality, for example, if no NF profile is found matching the preferred-locality. The NRF may also set a lower priority for additional NF profiles in the discovery response that do not match the preferred-locality.

Thus, preferred-locality is an optional attribute sent by consumer NFs during discovery that, when present, would be configured by the network operator to indicate a preferred location of a producer NF that would serve the consumer NF. Typically, the preferred-locality of a consumer NF would be the locality of the consumer NF or the locality of a preferred producer NF. The NRF should set a less-preferred (higher in number according to the 3GPP-defined priority numbering scheme where lower priority numbers indicate more preferred priorities) priority for any additional NFs in a discovery response with a registered locality parameter that does not match the preferred-locality identified in an NF discovery request. NF profiles that match the discovery request's search criteria will be ordered or prioritized as follows:

Preferred-Locality

Registered Priority Challenges associated with current NF discovery methods include the fact that inter-PLMN discovery requests from outside of the PLMN of the NRF processing the discovery requests either don't include a preferred-locality attribute or include a preferred-locality attribute that has no meaning in the PLMN of the NRF. Network operators may be unwilling to share locality attributes across PLMN boundaries. As a result, an NF discovery request may not include a preferred-locality attribute that matches a locality in the PLMN of the NRF.

Figure 2A:
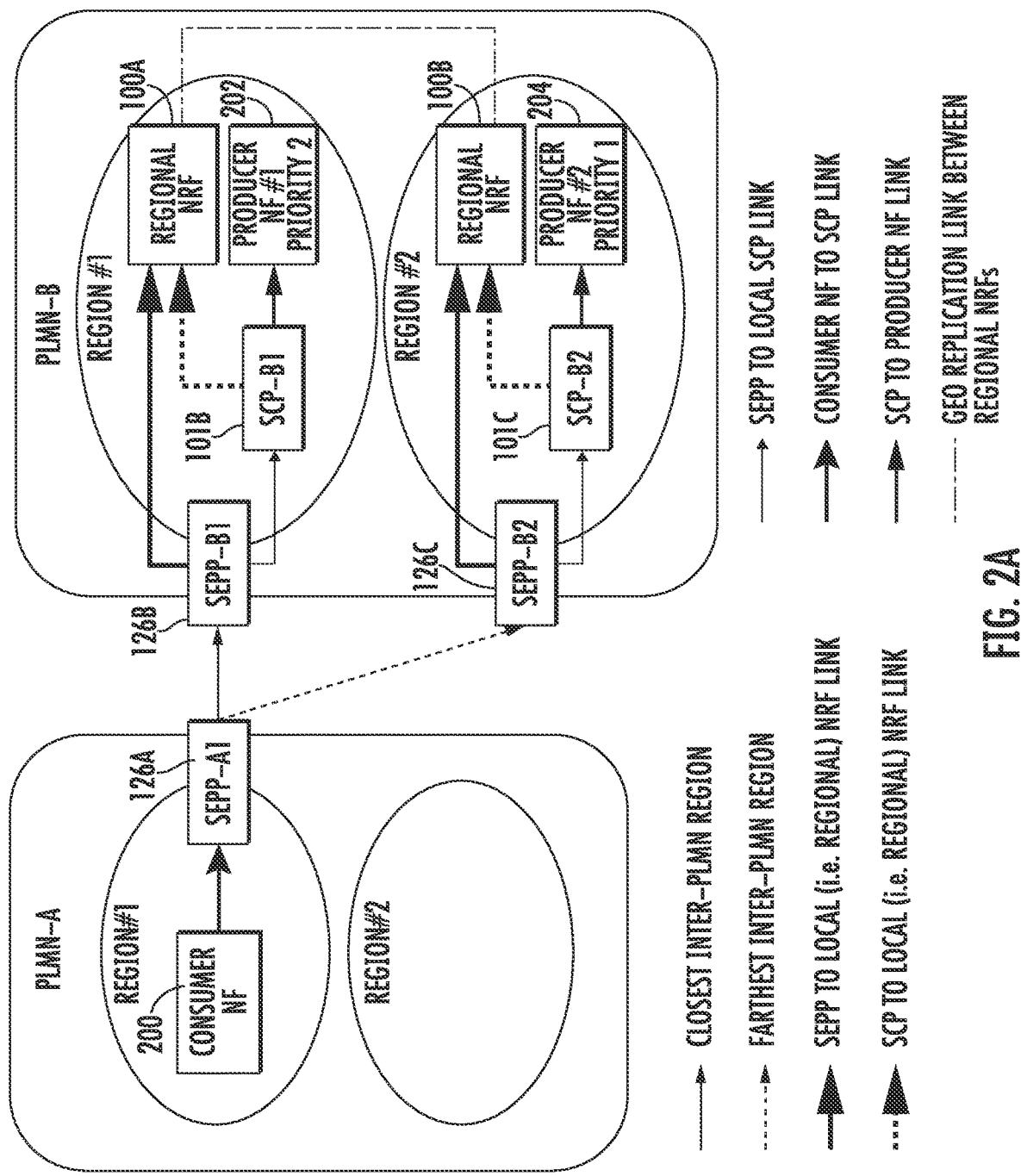
FIG. 2A is a network diagram illustrating an inter-PLMN use case for using an SCP or an SEPP to apply or override preferred-locality criteria in NF discovery requests.

In most cases, these inter-PLMN discovery requests land on NRFs in other PLMNs in a region near the consumer NF. In FIG. 2A, Region #1 in PLMN-A is shown to be near Region #1 in PLMN-B and far from Region #2 in PLMN-B. Also, in FIG. 2A, regional NRF 100A and Regional NRF 100B in PLMN B are geo-redundant NRFs sharing NF profiles of NF registered with the NRFs. Therefore, in most cases, inter-PLMN discovery requests from consumer NF 200 will land on regional NRF 100A in Region #1 of PLMN-B.

In the absence of a preferred-locality attribute in the NF discovery request, the list of NF profiles of producer NFs returned in the discovery response may prefer producer NFs located farther from the consumer NF than other producer NFs that are less preferred (higher priority) in the list. In FIG. 2A, in the absence of a preferred-locality attribute, the NF profiles of producer NFs returned by NRF 100A may be in the following order {Producer NF #2 204 (Priority-1), Producer NF #1 202 (Priority-2)}, i.e., based on priority. SEPPs 126A, 126B, and 126C as well as SCPs 101A and 101B are not involved in setting the preferred-locality attribute in the NF discovery request.

With this priority order, consumer NF 200 will most likely select producer NF #2 204 (Priority-1) to process a service request, which will result in an unnecessarily costly communication path for consumer NF 200, because producer NF #2 204 is farther from consumer NF 200 than producer NF #1 202.

Figure 2B:
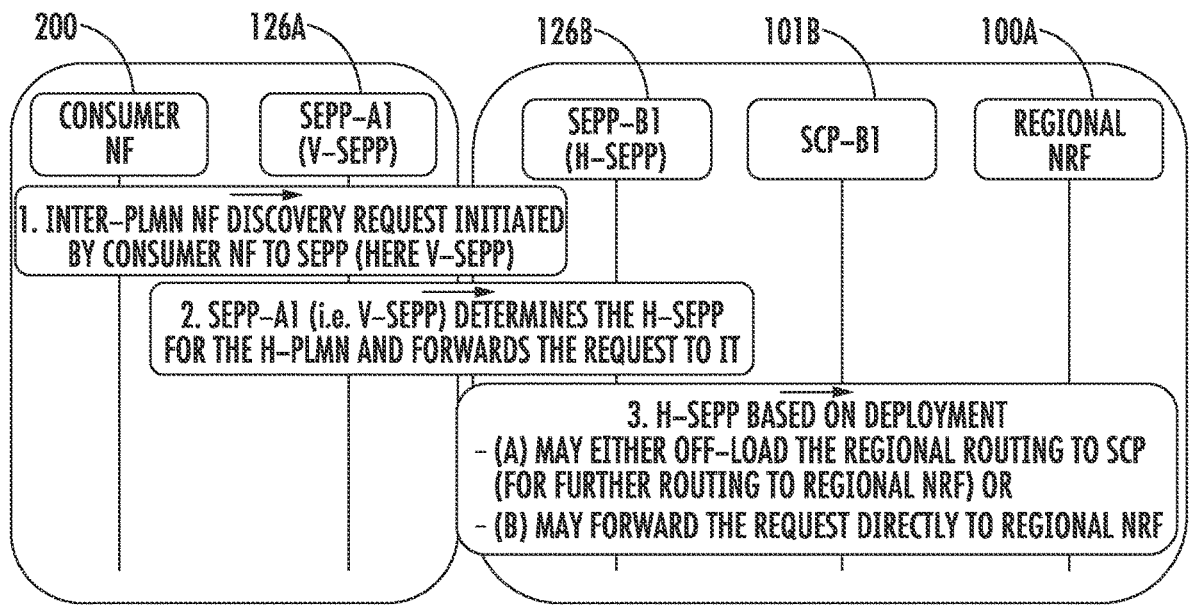
FIG. 2B is a message flow diagram illustrating exemplary messages exchanged between the network entities illustrated in FIG. 2A

FIG. 2B is a message flow diagram illustrating exemplary messages exchanged between the network entities illustrated in FIG. 2A. Referring to FIG. 2B, in line 1, consumer NF 200 initiates an inter-PLMN discovery request to visited SEPP 126A. The NF discovery request may lack a preferred-locality attribute or may include a preferred-locality attribute that has no meaning in the network to which the NF discovery request is destined. In line 2, visited SEPP 126A determines the home SEPP (H-SEPP) for the home public land mobile network (PLMN) and forwards the NF discovery request to H-SEPP 126B. In line 3, H-SEPP 126B either forwards the NF discovery request to SCP 101B in the home network for routing to the regional NRF for the home network or forwards the NF discovery request directly to the regional NRF 100A. Regional NRF 100A processes the NF discovery request and formulates and sends a discovery response to consumer NF 200. The priorities of the producer NF profiles returned in the NF discovery response may be sub-optimal due to the lack of a preferred-locality attribute that has meaning in the network of regional NRF 100A.

Figure 3A:
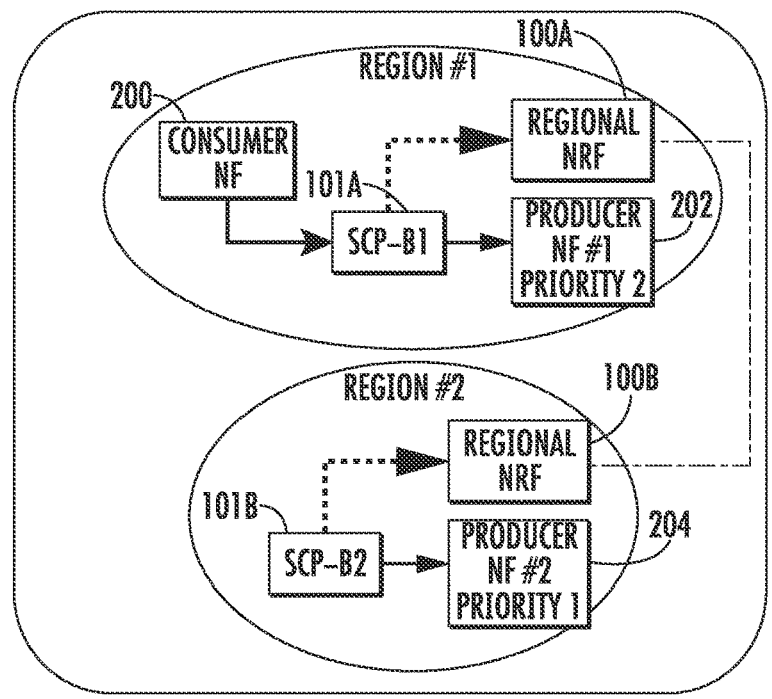
FIG. 3A is a network diagram illustrating an intra-PLMN use case for using an SCP or an SEPP to apply or override a preferred-locality attribute in an NF discovery request.
Figure 3B:
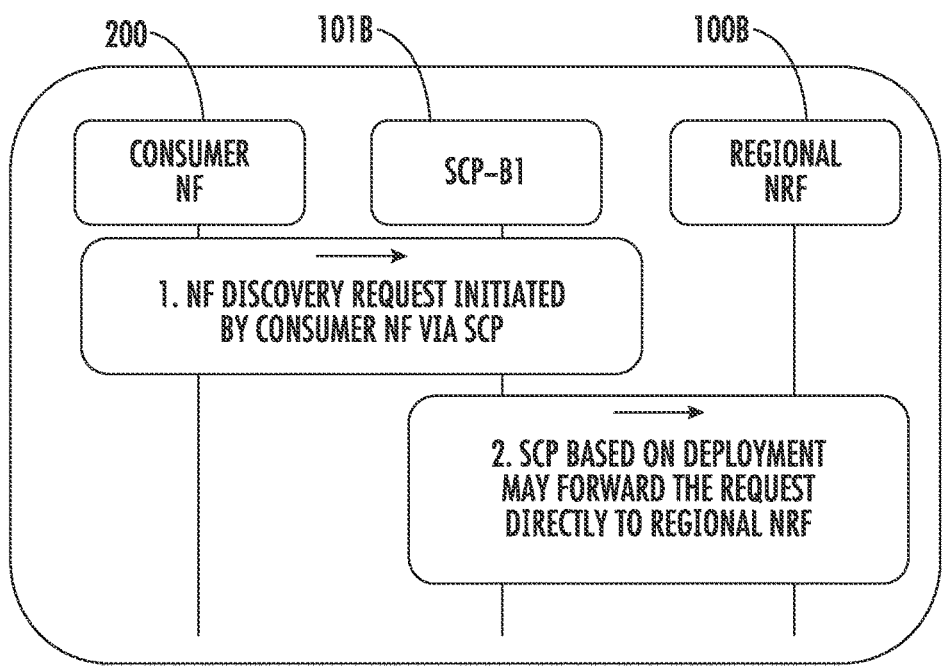
FIG. 3B is a message flow diagram illustrating exemplary messages exchanged for the intra-PLMN use case of FIG. 3A.

The above-described challenge also applies to intra-PLMN discovery use-cases, as illustrated in FIGS. 3A and 3B, where the intra-PLMN discovery requests that are used in indirect communications via the SCP either don't have preferred-locality attributes or have preferred-locality attributes with no meaning in the region of the NRF. In most cases, the discovery requests will land on the nearest regional NRF. In FIG. 3A, regional NRF 100A and regional NRF 1008 in PLMN B are geo-redundant NRFs sharing NF profiles of NF registered with the NRFs. In FIGS. 3A and 3B, intra-PLMN discovery requests from consumer NF 200 sent via SCP 101A will likely land on regional NRF 100A. Regional NRF 100A will select NF profiles of NFs that match the query parameters in the discovery request and produce a prioritized list of NF profiles that it sends to consumer NF 200 in a discovery response. Because producer NF #2 204 has a lower priority than producer NF #1 202, NRF 100A will prioritize producer NF #2 204 over producer NF #1 202. As with the inter-PLMN discovery case, this will result in sub-optimal producer NF selection as consumer NF 200 will select producer NF #2 204 to process service requests, even though producer NF #1 202 is closer.

Figure 4:
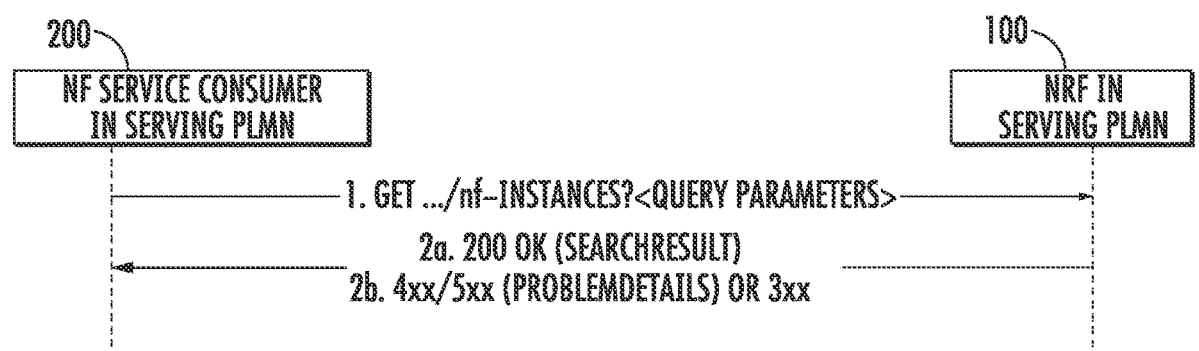
FIG. 4 is a message flow diagram illustrating exemplary messages exchanged between a consumer NF and an NRF during NF discovery.

FIG. 4 is a message flow diagram illustrating exemplary messages exchanged between an NF service consumer and an NRF in performing NF discovery. In line 1 of the message flow diagram illustrated in FIG. 4, NF service consumer 200 initiates the NF discovery process by sending and HTTP GET message to NRF 100. The HTTP GET message sent to the NRF to obtain service profiles of NF instances is also referred to as an NFDiscover request or NF discovery request. The HTTP GET message includes query parameters (such as NFtype) that the NRF uses to locate NF profiles of producer NFs that can provide the service identified by the query parameters or attributes. One such parameter or attribute is the preferred-locality attribute. If NF service consumer 200 is capable of formulating and NF discover message with a preferred-locality attribute that corresponds to a region within the PLMN of NRF 100, then the preferred-locality attribute can be effectively used to select a producer NF that is closer to consumer NF 200 than other producer NFs. However, if NF service consumer 200 is incapable of including a preferred-locality attribute or does not include a preferred-locality attribute that has meaning in the PLMN of NRF 100, NRF 100 may prioritize the list of NF profiles returned to consumer NF 200 in the discovery response based on registered producer NF priorities, which can result in sub-optimal NF selection, as illustrated in FIGS. 2A-3B.

In lines 2a and 2b of the message flow in FIG. 4, if the NF discovery request is successfully processed, NRF 100 responds with a 200 OK message that includes NF profile objects corresponding to the NF profiles of producer NFs that are able to provide the service identified in the discovery request. If the NF discovery process is not successful, NRF 100 may return a 4xx or 5xx message with problem details.

If the NF discovery request is redirected to another NRF, NRF 100 will return a 3xx message. It should be noted that the subject matter described herein applies to NF discovery requests from an NRF in a PLMN serving a consumer NF to an NRF in a home PLMN, as detailed in Section 5.3.2.2.3 of 3GPP TS 29.510 and service discovery where an intermediate forwarding NRF receives the NF discovery request from the consumer NF and forwards the NF discovery request to the NRF in another network or region as detailed in Section 5.2.2.2.5 of 3GPP TS 29.510. The NRF that receives the forwarded NF discovery request performs the look up in the NF profiles database to extract NF profiles that match the query parameters in the NF discovery request.

In order to avoid sub-optimal NF selection, the subject matter described herein includes an SCP or SEPP that can apply or override a preferred-locality attribute in an NF discovery request. In the case where the SCP or SEPP receives an inter-PLMN discovery request without a preferred-locality attribute or with a preferred-locality attribute that the SCP or SEPP chooses to override, the SCP or SEPP can insert or replace the preferred-locality attribute in the NF discovery request with:

the locality of the SCP or SEPP;
the locality nearest to the SCP or SEPP; or
using the nearest locality to the SCP or SEPP having at least one registered (successfully heart-beating) producer NF instance that matches the query parameters in the NF discovery request.

In the case where the SCP or SEPP receives an intra-PLMN discovery request with or without a preferred-locality attribute, it can again choose to override the preferred-locality attribute in the NF discovery request or apply an SCP or SEPP-selected attribute and forward the NF discovery request message to the NRF.

The overriding (replacement) or applying (inserting where no preferred-locality attribute exists) of the preferred-locality attribute by the SCP or SEPP applies to indirect communications without delegated discovery where the consumer NF formulates the discovery request, and the SCP or SEPP replaces or adds a preferred-locality attribute to the NF discovery request. The overriding or applying of the preferred-locality attribute by the SCP or SEPP also applies to indirect communications with delegated discovery where the SCP originates the NF discovery request on behalf of a consumer NF and a downstream SCP or SEPP applies or overrides the preferred locality attribute in the NF discovery request.

Figure 5A:
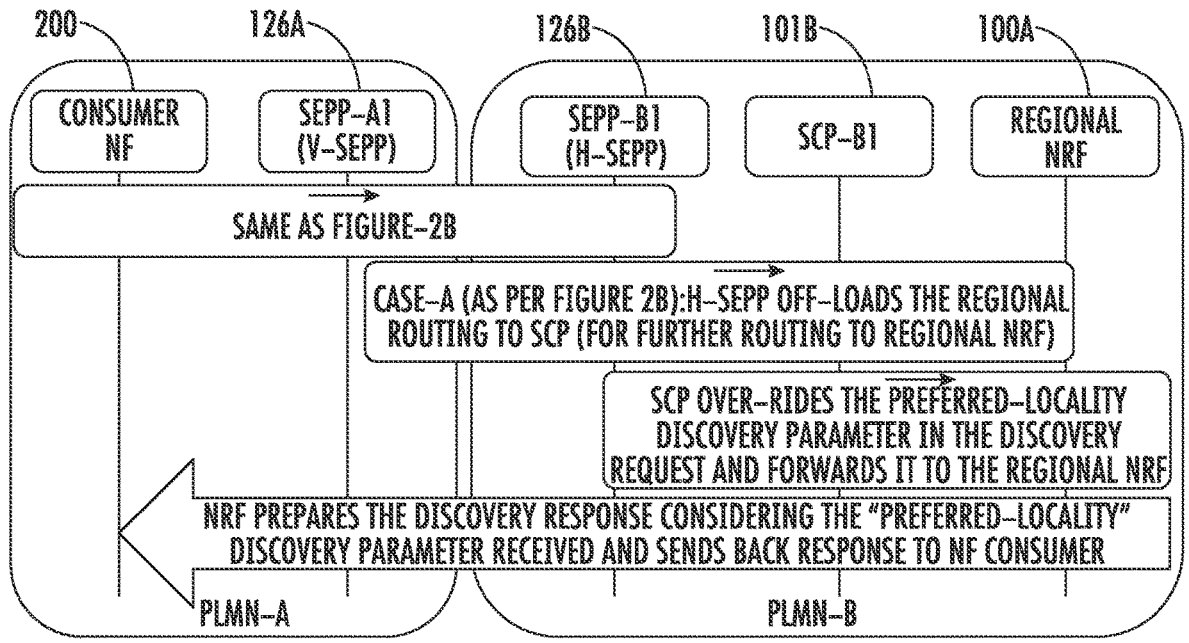
FIGS. 5A and 5B are flow diagrams illustrating exemplary messages exchanged for the inter-PLMN use case where the SCP or SEPP applies or overrides a preferred-locality attribute in an NF discovery request.

FIG. 5A is a message flow diagram illustrating an SCP that applies or overrides a preferred-locality attribute in an inter-PLMN discovery request. Referring to FIG. 5A, when consumer NF 200 located in PLMN-A sends a discovery request to NRF 100A located in PLMN-B, the discovery request may either lack a preferred-locality attribute or may include a preferred-locality attribute that corresponds to the consumer NF's locality in PLMN-A, which has no meaning in PLMN B. The NF discovery request is sent to V-SEPP 126A, which forwards the NF discovery request to H-SEPP 126B. In this example, it is assumed that H-SEPP 126B off-loads regional routing to SCP 101B. Accordingly H-SEPP 126B forwards the NF discovery request to SCP 101B. In response to receiving such a discovery request, SCP 101B may either override the preferred-locality attribute or apply an NRF-selected locality attribute, depending on whether the discovery request has a preferred-locality attribute. For example, if the NF discovery request has a preferred-locality attribute, SCP 101B may override the preferred-locality attribute in the NF discovery request by replacing the value of the preferred-locality attribute with a value selected by SCP 101B. If the NF discovery request lacks a preferred-locality attribute, SCP 101B may insert a preferred-locality attribute selected by SCP 101B and forward the NF discovery request to regional NRF 100A.

In one example, SCP 101B may use its own locality when overriding or applying the locality to the NF discovery request. In another example, SCP 101B may utilize the closest locality to SCP 101B and/or the closest locality to SCP 101B with a heart-beating producer NF capable of providing the service identified from the query parameters in the NF discovery request. A consumer NF is likely to send an NF discovery request to an SCP 101B that is in a region or PLMN that is close to the requesting consumer NF. As a result, using the SCP's own locality, the closest locality known to the SCP, a locality configured by the network operator, and/or the closest locality to the SCP with a heart-beating producer NF that matches the query parameters to process the discovery request has a good chance of producing a list of NF profiles of producer NFs that are closer to the requesting consumer NF with lower (more preferred) priorities than NF profiles of producer NFs that are farther away from the requesting consumer NF.

NRF 100A returns a prioritized list of NF profiles with the NF profile of producer NF #1 202 having a lower priority (more preferred) than producer NF #2 204. As a result, when consumer NF 200 selects a producer NF to process a service request, consumer NF 200 will select producer NF #1 202 to process the service request over producer NF #2 204, which will result in more efficient and lower latency service communications in the core network over the scenario illustrated in FIGS. 2A and 2B. As stated above with regard to FIG. 4, it is not necessary that the discovery request originate from consumer NF 200. The discovery request may originate from an NRF on behalf of consumer NF 200 in the redirecting or inter-PLMN cases as described in 3GPP TS 29.510. The NF discovery request may also originate from an SCP. The locality-based override or application processes described herein can be used by the SCP or SEPP in processing NF discovery requests originating from consumer NFs, SCPs, or other NRFs.

It should be noted that in FIG. 5A, NRF 100A assigns priorities to the NF profiles in the NF discovery response based on the preferred-locality attribute inserted by SCP 101B into the NF discovery request. Assigning priorities to NF profiles using the preferred-locality attribute in an NF discovery request is a 3GPP-compliant behavior (see Section 6.2.3.2.3.1-1 of 3GPP TS 29.510). Because the SCP or SEPP creates or modifies the NF discovery request to include a preferred-locality attribute that has meaning in the region of the processing NRF, the NRF is not required to implement preferred-locality override functionality, thus simplifying discovery request processing performed by the NRF.

Figure 5B:
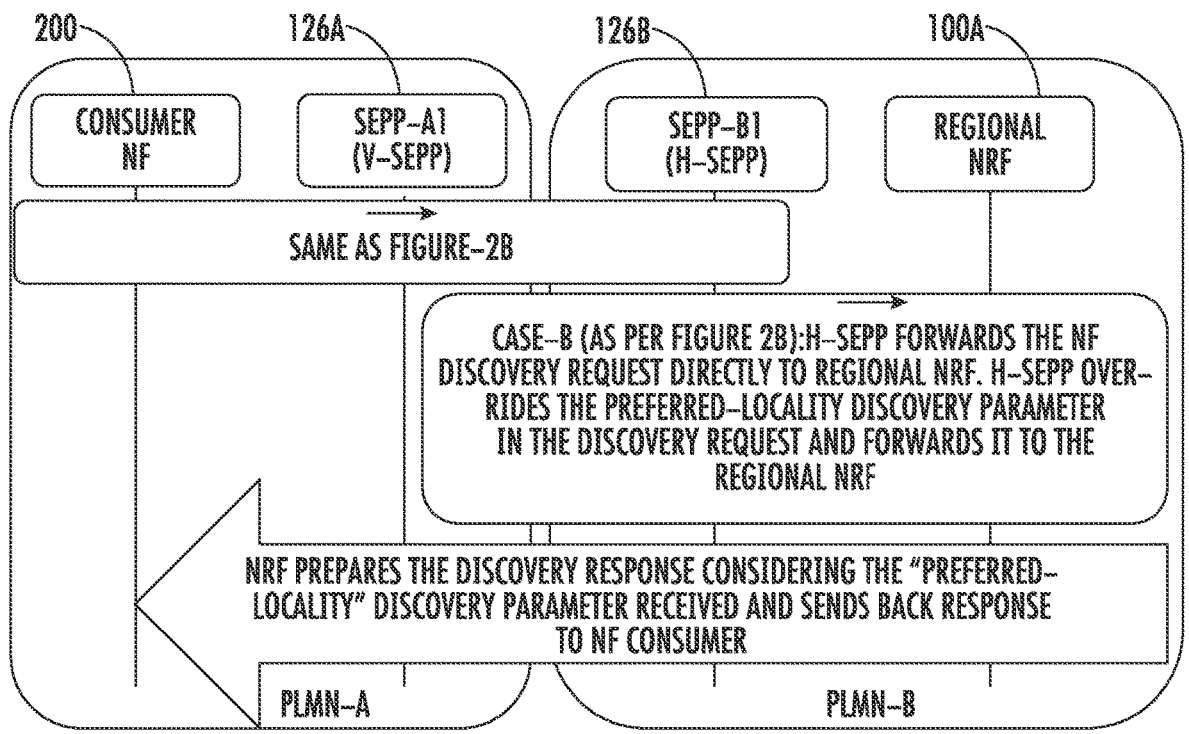

FIG. 5B is a message flow diagram for an inter-PLMN discovery request similar to FIG. 5A except that the home SEPP instead of the SCP overrides or applies the preferred-locality attribute to the NF discovery request. Referring to the message flow in FIG. 5B, H-SEPP 126B receives an NF discovery request from V-SEPP 126A. H-SEPP 126B either overrides (i.e., replaces) the preferred-locality attribute in the NF discovery request or applies (i.e., adds) a preferred-locality attribute to the NF discovery request before forwarding the NF discovery request to NRF 100A. NRF 100A processes the NF discovery request using the preferred-locality attribute inserted into the NF discovery request by H-SEPP 101A and returns a list of NF profiles that are prioritized according to the SEPP-inserted preferred-locality attribute.

Figure 6:
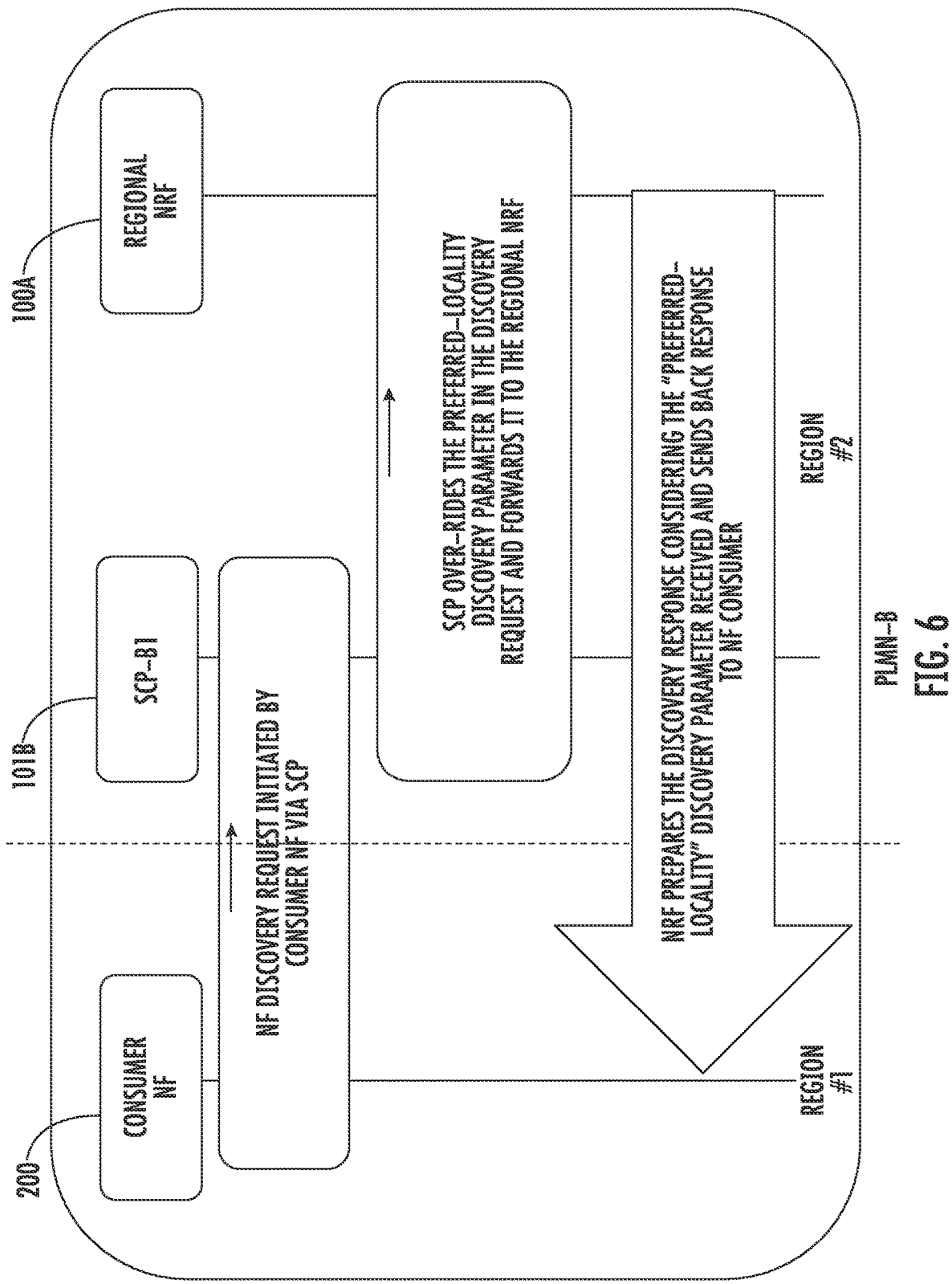
FIG. 6 is a message flow diagram illustrating exemplary messages exchanged for the intra-PLMN use case where the SCP applies or overrides a preferred-locality attribute in an NF discovery request.

Overriding or applying a preferred-locality to an NF discovery request also applies to an intra-PLMN discovery request, i.e., a discovery request send from an NF to an NRF that are both in the same PLMN. FIG. 6 illustrates this case. Referring to FIG. 6, when consumer NF 200 located in Region #1 of PLMN-B sends a discovery request to NRF 100A, which is also located in Region #1 of PLMN B, the discovery request may either lack a preferred-locality attribute or may include a preferred-locality attribute that corresponds to the consumer NF's locality (Region #1) in PLMN-B. For the case of indirect communications, the NF discovery request may be sent to SCP 101B located in region #2 of PLMN-B. In response to receiving such a discovery request, SCP 101B may either override the preferred-locality attribute or apply an SCP-selected preferred-locality attribute, depending on whether the discovery request has a preferred-locality attribute. For example, if the NF discovery request has a preferred-locality attribute, SCP 101B may override the preferred-locality attribute in the NF discovery request by replacing the value of the preferred-locality attribute in the NF discovery request with an SCP-selected value. If the NF discovery request lacks a preferred-locality attribute, SCP 101B may apply or insert an SCP-selected locality into the NF discovery request before forwarding the NF discovery request to NRF 100A.

In one example, SCP 101A may use its own locality when overriding or applying the locality to the NF discovery request. In another example, SCP 101B may utilize the closest locality to SCP 101B and/or the closest locality to SCP 101B with a heart-beating producer NF capable of providing the service identified from the query parameters in the discovery request. A consumer NF is likely to send an NF discovery request to an SCP that is in a region or PLMN that is close to the requesting consumer NF. As a result, using the SCP's own locality, the closest locality known to the SCP, and/or the closest locality to the SCP with a heart-beating producer NF that matches the query parameters to process the discovery request has a good chance of producing a list of NF profiles of producer NFs that are closer to the requesting consumer NF with lower (more preferred) priority than NF profiles of producer NFs that are farther away from the requesting consumer NF.

In response to the NF discovery request, NRF 100A returns a prioritized list of NF profiles with the NF profile of producer NF #1 202 having a lower priority (more preferred) than producer NF #2 204. As a result, when consumer NF 200 selects a producer NF to process a service request, consumer NF 200 will select producer NF #1 202 to process the service request over producer NF #2 204, which will result in more efficient and lower latency service communications in the core network over the scenario illustrated in FIGS. 3A and 3B.

It should be noted that in FIG. 6, like the inter-PLMN case illustrated in FIGS. 5A and 5B, NRF 100A assigns new priorities based on the preferred-locality attribute in the NF discovery request received by NRF 100A. This is standard NRF behavior, which means that NRF 100A is not required to be modified to support the preferred-locality override or application processing described herein. Implementing preferred-locality override or application processing at the SCP or SEPP thus simplifies the processing performed by the NRF to produce a set of NF profiles that is optimized for the consumer NF.

Figure 7:
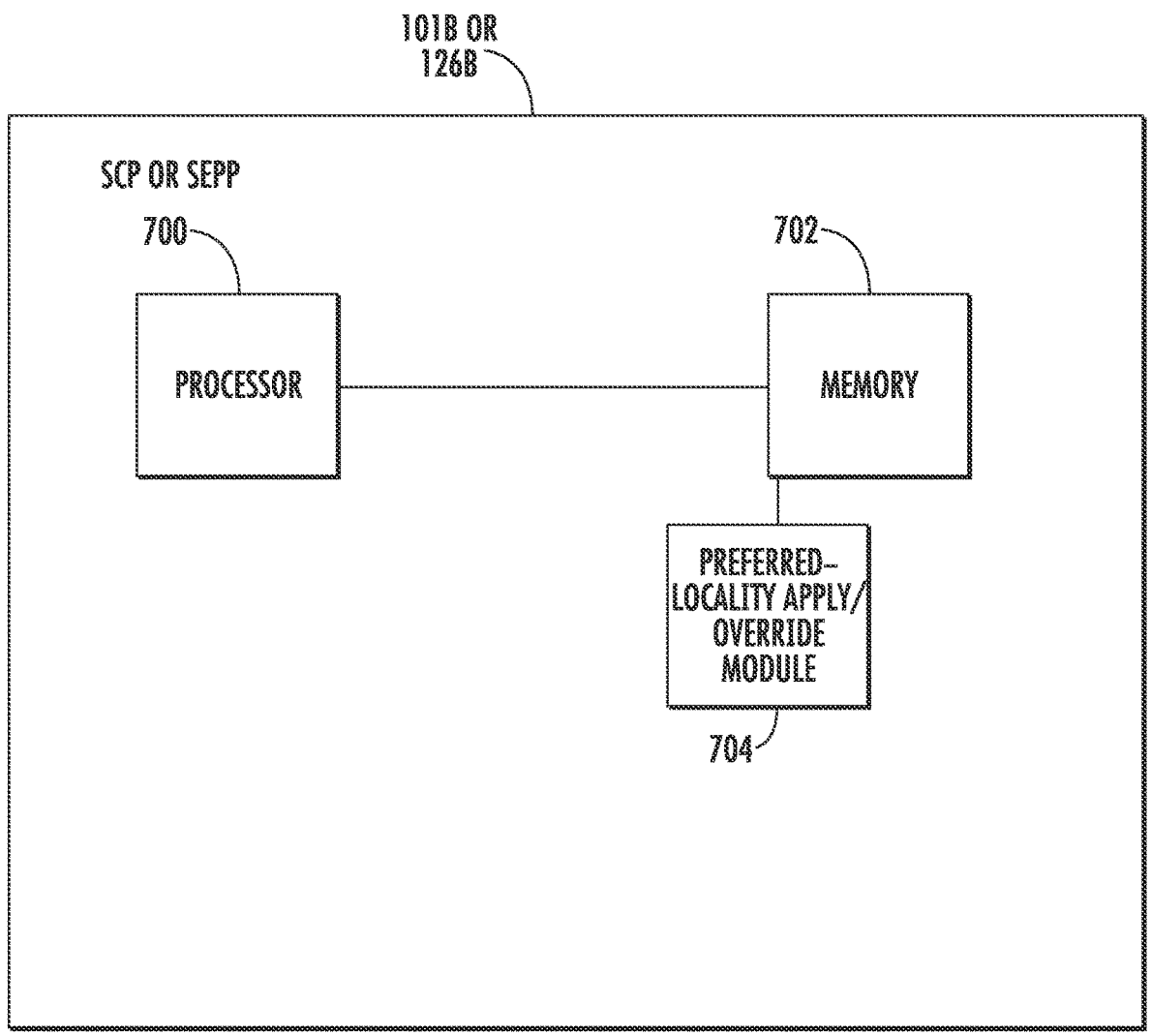
FIG. 7 is a block diagram illustrating an exemplary architecture for an SCP or SEPP that applies or overrides a preferred-locality attribute in an NF discovery request.

FIG. 7 is a block diagram illustrating an exemplary architecture for an SCP or SEPP 101B or 126B that is capable of applying or overriding a preferred-locality during NF discovery. Referring to FIG. 7, SCP or SEPP 101B or 126B includes at least one processor 700 and a memory 702. SCP or SEPP 101B or 126B further includes a preferred-locality apply/override module 704 that performs the steps described herein for applying or overriding a preferred-locality attribute in an NF discovery request. Preferred-locality apply/override module 704 may be implemented using computer executable instructions stored in memory 702 and executed by processor 700.

Figure 8:
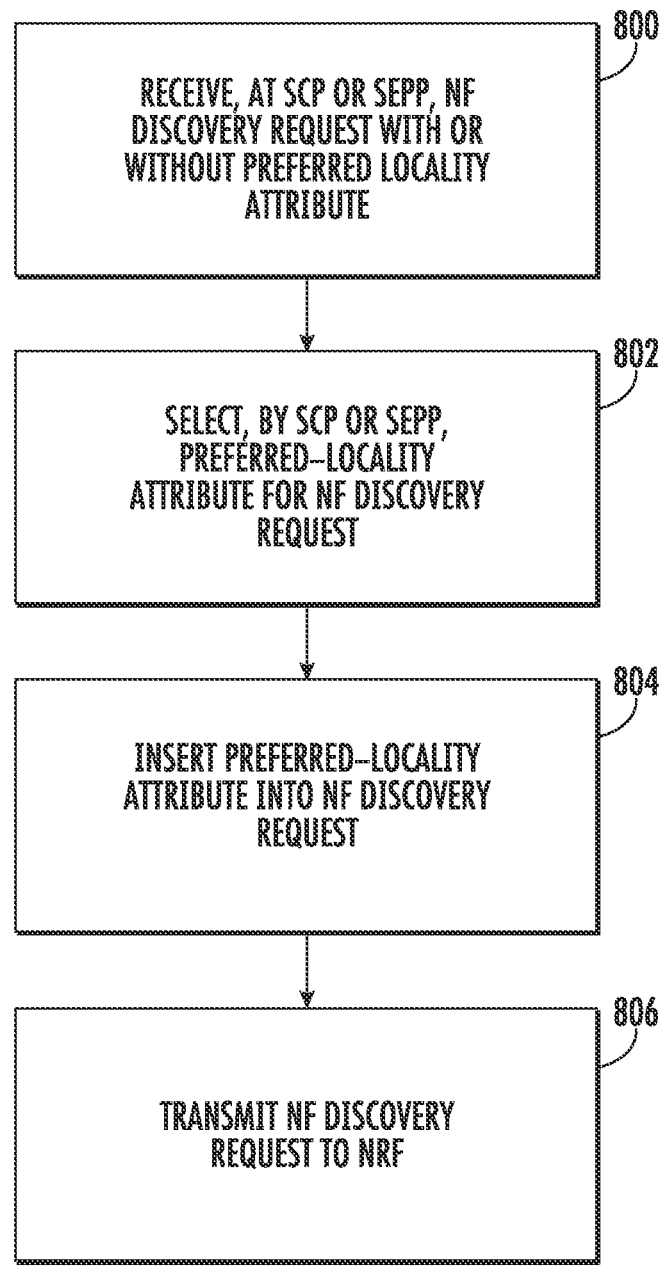
FIG. 8 is a flow chart illustrating an exemplary process implemented by an SCP or SEPP in applying or overriding a preferred-locality attribute in an NF discovery request.

FIG. 8 is a flow chart illustrating an exemplary process for applying or overriding a preferred-locality attribute during NF discovery. Referring to FIG. 8, in step 800, the process includes receiving at an SCP or SEPP and from an NF, an NF discovery request including a preferred-locality attribute or lacking a preferred-locality attribute. For example, SCP or SEPP 101B or 126B may receive an NF discovery request from a consumer NF, an SCP, or an SEPP. The NF discovery request may be an inter-PLMN NF discovery request or an intra-PLMN NF discovery request with or without a preferred-locality attribute.

In step 802, the process includes selecting, by the SCP or SEPP, a value for the preferred-locality attribute for the NF discovery request. For example SCP or SEPP 101B or 126B may select a value for the preferred-locality attribute to insert in the NF discovery request where the value corresponds to a locality of the SCP or SEPP, a value selected by the network operator, a nearest locality to a locality of the SCP or SEPP, or a nearest locality to the locality of the SCP or SEPP with at least one heart-beating NF capable of providing the service identified by query parameters in the NF discovery request. In the case where the SCP or SEPP selects the value of the preferred-locality attribute value to correspond to a nearest locality to the locality of the SCP or SEPP with at least one heart-beating NF capable of providing the service identified by the query parameters in the NF discovery request, the SCP or SEPP may include or have access to an NF profiles database of NF profiles registered with an NRF so that the SCP or SEPP can determine whether the locality includes producer NF capable of providing the identified service.

In step 804, the process includes inserting, by the SCP or SEPP, the value for the preferred-locality attribute into the NF discovery request. For example, SCP 101B or SEPP 126B may insert the SCP- or SEPP-selected value for the preferred-locality attribute in the NF discovery request where the selected value replaces the value inserted in the NF discovery request by the originating NF or is added to the NF discovery request in the case where the NF discovery request does not include a preferred-locality attribute.

In step 806, the process includes transmitting, by the SCP or SEPP, the NF discovery request to a network function repository function (NRF). For example, SCP 101B or SEPP 126B may transmit the NF discovery request to the NRF local to SCP 101B or SEPP 126B. The NRF may utilized the SCP- or SEPP-selected preferred-locality attribute value to set priorities of NF profiles to be returned to the NF in the NF discovery response.

Advantages of the subject matter described herein include enhanced NF discovery for both inter-PLMN and intra-PLMN discovery requests. Because the list of NF profiles returned to the requesting consumer NF are prioritized according to an SCP- or SEPP-selected locality, the consumer NF is more likely to select a producer NF to provide service that is closer to the consumer NF, resulting in more efficient service messaging in the network. In addition, because the SCP or SEPP applies or overrides the value of the preferred-locality attribute in the NF discovery request prior to forwarding the NF discovery request to the NRF, the NRF is not required to implement preferred-locality attribute applying or overriding functionality and can instead implement standard NRF behavior in processing NF discovery request, for example, as specified in 3GPP TS 28.510.

The disclosure of each of the following references is hereby incorporated herein by reference in its entirety.

REFERENCES 1. 3$^{rd}$ Generation Partnership Project; Technical Specification Group Services and System Aspects; System architecture for the 5G System (5GS); Stage 2 (Release 17) 3GPP TS 23.501 V17.0.0 (2021-03).
2. 3rd Generation Partnership Project; Technical Specification Group Core Network and Terminals; 5G System; Network Function Repository Services; Stage 3 (Release 17) 3GPP TS 29.510 V17.1.0 (2021-03).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for applying or overriding a preferred-locality attribute during network function (NF) discovery, the method comprising:
   at a service communication proxy (SCP) located in a home network or a home security edge protection proxy (SEPP) including at least one processor:
     receiving, from an NF located in a visited network, an NF discovery request including, as a query parameter of the NF discovery request, a preferred-locality attribute value;
     selecting, by the SCP located in the home network or the home SEPP, a value to replace the preferred-locality attribute value in the NF discovery request, wherein selecting the value to replace the preferred-locality attribute value includes selecting a value that corresponds to a nearest locality to a locality of the SCP located in the home network or the home SEPP with at least one heart-beating producer NF capable of providing the service indicated by query parameters in the NF discovery request;
     overriding the value of the preferred-locality attribute in the NF discovery request by replacing, by the SCP located in the home network or the home SEPP, the value for the preferred-locality attribute included as a query parameter in the NF discovery request with the value selected by the SCP located in the home network or the home SEPP; and
     transmitting, by the SCP located in the home network or the home SEPP, the NF discovery request to a network function repository function (NRF) located in the home network.

2. The method of claim 1 wherein selecting the value to replace the preferred-locality attribute value includes selecting a value that is configured by a network operator.

3. The method of claim 1 wherein the SCP located in the home network or the home SEPP comprises the home SEPP and the NF discovery request comprises an inter-PLMN NF discovery request.

4. The method of claim 1 wherein the SCP located in the home network or the home SEPP comprises the SCP located in the home network and the NF discovery request comprises an inter-PLMN NF discovery request.

5. The method of claim 1 comprising, at the NRF, using the value of the preferred-locality attribute selected by the SCP located in the home network or the home SEPP to prioritize producer NF profiles in an NF discovery response.

6. A system for applying or overriding a preferred-locality attribute during network function (NF) discovery, the system comprising:
a service communication proxy (SCP) configured to operate in a home network or a home security edge protection proxy (SEPP) including at least one processor; and
a preferred-locality apply/override module implemented by the at least one processor for receiving, from an NF located in a visited network, an NF discovery request including, as a query parameter of the NF discovery request, a preferred-locality attribute value, selecting a value to replace the preferred-locality attribute in the NF discovery request, overriding the value of the preferred-locality attribute included as a query parameter in the NF discovery request by replacing the value for the preferred-locality attribute in the NF discovery request with the value selected by the SCP configured to operate in the home network or the home SEPP, and transmitting the NF discovery request to a network function repository function (NRF) located in the home network, wherein the preferred-locality apply/override module is configured to replace the preferred-locality attribute value with a value that corresponds to a nearest locality to a locality of the SCP located in the home network or the home SEPP with at least one heart-beating producer NF capable of providing the service indicated by query parameters in the NF discovery request.

7. The system of claim 6 wherein the preferred-locality apply/override module is configured to replace the preferred-locality attribute value with a value that is configured by a network operator.

8. The system of claim 6 wherein the SCP located in the home network or the home SEPP comprises the home SEPP and the NF discovery request received by the preferred-locality apply/override module comprises an inter-PLMN NF discovery request.

9. The system of claim 6 wherein the SCP located in the home network or the home SEPP comprises the SCP located in the home network and the NF discovery request received by the preferred-locality apply/override module comprises an inter-PLMN NF discovery request.

10. A non-transitory computer readable medium having stored thereon executable instructions that when executed by a processor of a computer control the computer to perform steps comprising:
at a service communication proxy (SCP) located in a home network or a home security edge protection proxy (SEPP):
receiving, from an NF located in a visited network, an NF discovery request including, as a query parameter of the NF discovery request, a preferred-locality attribute value;
selecting, by the SCP located in the home network or the home SEPP, a value to replace the preferred-locality attribute value included as a query parameter in the NF discovery request, wherein selecting the value to replace the preferred-locality attribute value includes selecting a value that corresponds to a nearest locality to a locality of the SCP located in the home network or the home SEPP with at least one heart-beating producer NF capable of providing the service indicated by query parameters in the NF discovery request;
overriding the value of the preferred-locality attribute included as a query parameter in the NF discovery request by replacing, by the SCP or SEPP, the value for the preferred-locality attribute included as a query parameter in the NF discovery request with the value selected by the SCP located in the home network or the home SEPP; and
transmitting, by the SCP located in the home network or the home SEPP the NF discovery request to a network function repository function (NRF) located in the home network.

* * * * *

UNITED STATES PATENT AND TRADEMARK OFFICE
CERTIFICATE OF CORRECTION

| | | |
|---|---|---|
| PATENT NO. | : 12,127,297 B2 | Page 1 of 1 |
| APPLICATION NO. | : 17/468076 | |
| DATED | : October 22, 2024 | |
| INVENTOR(S) | : Goel | |

It is certified that error appears in the above-identified patent and that said Letters Patent is hereby corrected as shown below:

On the Title Page

Column 1, under item (54) Title, Line 3, delete "COMMUNICATIONS" and insert -- COMMUNICATION --, therefor.

In the Specification

In Column 1, Line 3, delete "COMMUNICATIONS" and insert -- COMMUNICATION --, therefor.

In Column 5, Line 24, delete "2A" and insert -- 2A. --, therefor.

In Column 6, Line 30, delete "(loT)" and insert -- (IoT) --, therefor.

In Column 7, Line 15, delete "(NOTE 3):" and insert -- NOTE 3: --, therefor.

In the Claims

In Column 16, Line 39, in Claim 10, delete "SEPP" and insert -- SEPP, --, therefor.

Signed and Sealed this
Eleventh Day of February, 2025

Coke Morgan Stewart
*Acting Director of the United States Patent and Trademark Office*